US008666254B2

(12) United States Patent
Chan et al.

(10) Patent No.: US 8,666,254 B2
(45) Date of Patent: Mar. 4, 2014

(54) SYSTEM AND METHOD OF WIRELESS OPTICAL COMMUNICATION

(75) Inventors: Eric Yuen-Jun Chan, Mercer Island, WA (US); Dennis G. Koshinz, Bellevue, WA (US)

(73) Assignee: The Boeing Company, Chicago, IL (US)

( * ) Notice: Subject to any disclaimer, the term of this patent is extended or adjusted under 35 U.S.C. 154(b) by 223 days.

(21) Appl. No.: 13/094,361

(22) Filed: Apr. 26, 2011

(65) Prior Publication Data

US 2012/0275795 A1 Nov. 1, 2012

(51) Int. Cl.
*H04B 10/00* (2013.01)
(52) U.S. Cl.
USPC .......................... 398/128; 398/124; 398/130
(58) Field of Classification Search
USPC .................................................. 398/118–130
See application file for complete search history.

(56) References Cited

U.S. PATENT DOCUMENTS

| | | | |
|---|---|---|---|
| 4,842,391 A | 6/1989 | Kim et al. | |
| 5,022,733 A | 6/1991 | Angenent et al. | |
| 5,638,475 A | 6/1997 | Gaebe | |
| 5,684,901 A | 11/1997 | Gaebe | |
| 5,768,458 A | 6/1998 | Ro et al. | |
| 5,808,760 A | 9/1998 | Gfeller | |
| 5,926,301 A | 7/1999 | Hirt | |
| 6,323,474 B1 | 11/2001 | Bacarella | |
| 6,584,250 B2 | 6/2003 | Lin et al. | |
| 6,614,126 B1 | 9/2003 | Mitchell | |
| 6,829,439 B1 | 12/2004 | Sidorovich et al. | |
| 7,298,942 B2 | 11/2007 | Blasingame et al. | |
| 7,455,463 B2 | 11/2008 | Togami et al. | |
| 7,597,486 B2 | 10/2009 | Teo et al. | |
| 7,742,704 B2 | 6/2010 | Suzuki et al. | |
| 7,744,293 B2 | 6/2010 | Huang et al. | |
| 7,762,729 B2 | 7/2010 | Teo et al. | |
| 2001/0007505 A1* | 7/2001 | Lee et al. | 358/500 |
| 2003/0035182 A1 | 2/2003 | Sidorovich et al. | |
| 2005/0047731 A1 | 3/2005 | Hu et al. | |
| 2006/0002667 A1 | 1/2006 | Aronson | |
| 2006/0056855 A1* | 3/2006 | Nakagawa et al. | 398/183 |

(Continued)

OTHER PUBLICATIONS

International Search Report and Written Opinion of the International Searching Authority, International Application No. PCT/US2012/030621, Dated May 31, 2012, ISA/EPO, 14 pgs.

(Continued)

*Primary Examiner* — Dzung Tran
(74) *Attorney, Agent, or Firm* — Toler Law Group, PC

(57) ABSTRACT

Systems, methods, and a vehicle are disclosed to enable wireless optical communications. A wireless optical transceiver includes transmitter light source configured to transmit a first optical signal at a first wavelength via a first ball lens to generate a distributed first optical signal. The distributed first optical signal is configured to be received by a remote receiver via a first line-of-sight transmission. A detector is configured to receive a focused second optical signal at a second wavelength via a second ball lens. A controller is operably coupled to the light source and to the detector. The controller is configured to receive outgoing data and to generate a first electrical signal configured to modulate the first optical signal to transmit the outgoing data. The controller also is configured to receive a second electrical signal from the detector and to demodulate the second electrical signal to generate incoming data.

20 Claims, 8 Drawing Sheets

(56) References Cited

U.S. PATENT DOCUMENTS

| | | | |
|---|---|---|---|
| 2006/0153507 | A1 | 7/2006 | Togami et al. |
| 2007/0159773 | A1 | 7/2007 | Deng et al. |
| 2007/0229302 | A1 | 10/2007 | Penick et al. |
| 2008/0019700 | A1 | 1/2008 | Minota |
| 2008/0101752 | A1 | 5/2008 | Chan et al. |
| 2008/0159737 | A1 | 7/2008 | Noble et al. |
| 2009/0095575 | A1 | 4/2009 | Nakamura |
| 2009/0208221 | A1* | 8/2009 | Sasai .................... 398/130 |
| 2010/0135620 | A1 | 6/2010 | Chou |
| 2010/0135671 | A1 | 6/2010 | Park et al. |
| 2010/0189285 | A1 | 7/2010 | Niehoff |
| 2010/0209118 | A1 | 8/2010 | Takene et al. |
| 2010/0265414 | A1 | 10/2010 | Nieuwlands |
| 2010/0322635 | A1 | 12/2010 | Klinghult |
| 2011/0110668 | A1* | 5/2011 | Lee et al. .................... 398/118 |

OTHER PUBLICATIONS

Yun, G. et al., "Spot-Diffusing and Fly-Eye Receivers for Indoor Infrared Wireless Communications", 1992 IEEE International Conference on Selected Topics in Wireless Communications, Jun. 25-26, 1992, Vancouver, B.C., Canada, pp. 262-265.

Komine et al., Fundamental Analysis for Visible-Light Communication System using LED Lights, IEEE Transactions on Consumer Electronics, vol. 50, No. 1, Feb. 2004, (7 pgs).

Alqudah et al., MIMO Characterization of Indoor Wireless Optical Link using a Diffuse-Transmission Configuration, IEEE Transaction on Communications, vol. 51, No. 9, Sep. 2003, (7 pgs).

(SFF MSA) Small Form Factor Transceiver Multisource Agreement, http://www.schelto.com/SFP/SFF/Revised%20SFF%20MSA%20July%202000.pdf; Jul. 5, 2000, (13 pgs).

* cited by examiner

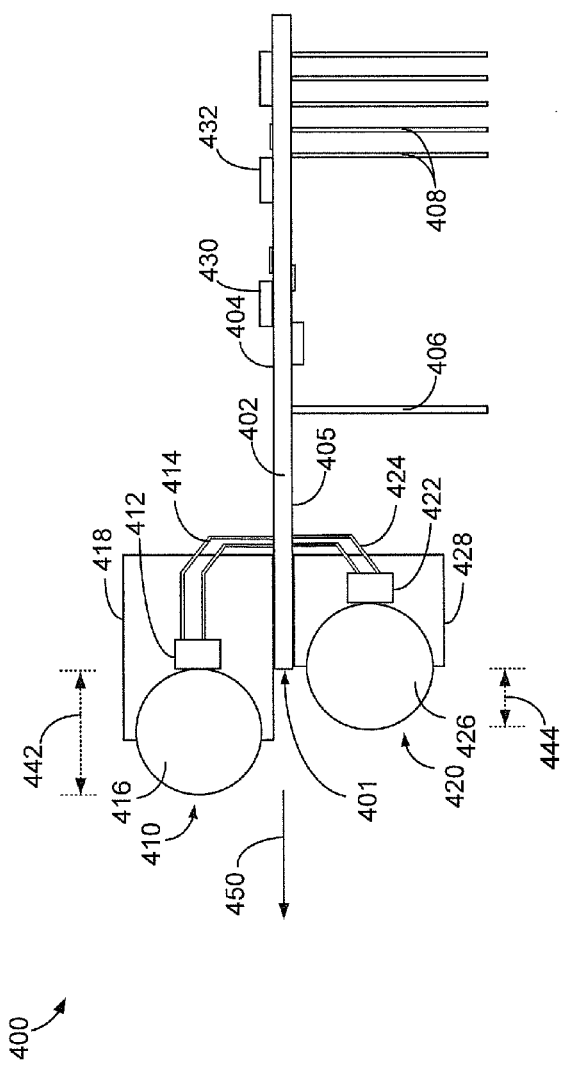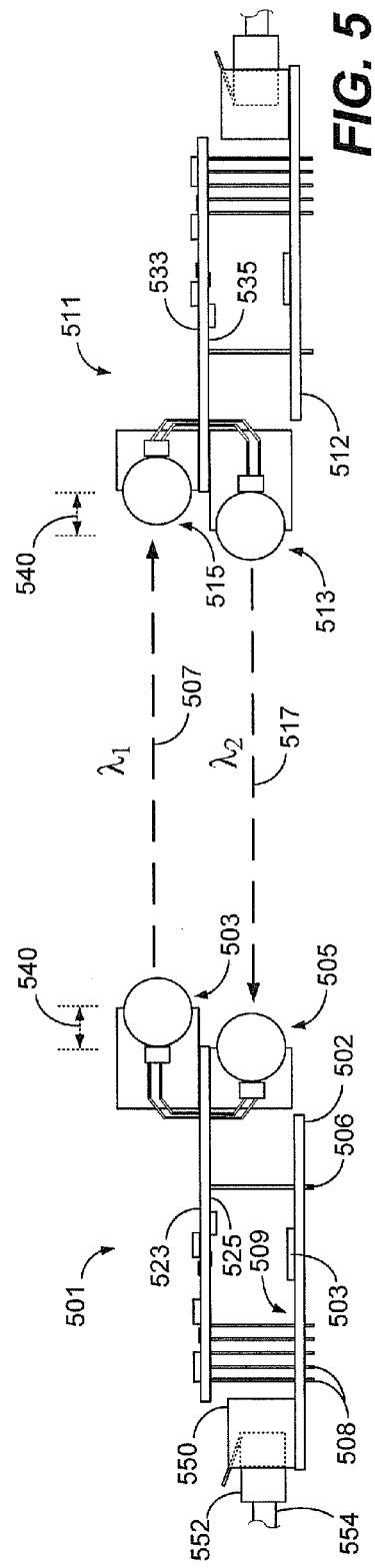

SYSTEM AND METHOD OF WIRELESS OPTICAL COMMUNICATION

FIELD OF THE DISCLOSURE

The present disclosure is generally related to wireless communication.

BACKGROUND

Many people take advantage of the convenience of wireless communication devices for both personal and professional uses. Wireless telephones enable individuals to talk with family, friends, and associates wherever the individuals might be. Businesses provide wireless computer networks for the convenience of employees and patrons that use computers. The proliferation of smart phones, electronic reading devices, and tablet-style computers further increases individuals' use of wireless networks.

Implementing wireless routers or access points for computer networks may reduce the cost and difficulty of installing wiring to support a computer network. Further, in the case of installing networks on vehicles, such as commercial aircraft, ships, trains, or motor vehicles, implementing a wireless network may reduce weight of the wiring that would have to be added to the vehicles to interface with computing devices.

Using wireless communications may present some disadvantages. For example, some wireless communications may not be secure as the communications may be intercepted. In addition, wireless, radio frequency (RF) communications may interfere with operation of communication and avionics equipment aboard an aircraft.

SUMMARY

Wireless optical transceivers, methods, and vehicles are disclosed to enable wireless optical communications. In contrast to wireless radio frequency (RF) communications, the wireless optical transceivers communicate by modulating optical signals. The wireless optical transceivers may communicate via modulation of visible light. The visible light signals may be modulated at a sufficiently high frequency that the modulation is not detectable by human vision. Thus, a wireless optical transceiver may be coupled with a light source, such as a cabin light or an individual passenger light on an aircraft or another type of vehicle, and the wireless optical transceiver may both provide visible light and transmit a data signal. Alternatively, the wireless optical transceiver may communicate by modulating a light signal light that is outside of a visible spectrum, such as an infrared signal.

A wireless optical transceiver may include separate transmitter and receiver optical subassemblies. The optical subassemblies may include ball lenses to enable wide angle transmission and wide angle reception of optical signals. In a particular embodiment, the wireless optical transceivers may be of a configuration that corresponds to the Small Form Factor Transceiver Multisource Agreement (SFF MSA). The wireless optical transceiver may support full duplex, bidirectional communication between nodes. The transmitter optical subassembly may be positioned at an offset to the receiver optical subassembly so that signals transmitted by an optical transmitter do not interfere with reception of other signals by an optical receiver. To further prevent interference, the transmitter optical subassembly and the receiver optical subassembly may be positioned at opposite ends of the wireless optical transceiver. The transmitter optical subassembly also may be configured to transmit at a first wavelength while the receiver optical subassembly may be configured to receive signals from transmitters that operate at a second wavelength.

The wireless optical transceiver may communicate with other transceivers, such as wireless optical transceivers associated with in-flight or in-transit entertainment systems installed in an interior cabin. Using wireless optical communication, a passenger may make selections from available entertainment offerings and on-board systems can provide the entertainment offerings to the passenger's individual entertainment device. The wireless optical communication enables bidirectional exchange of data without the cost, complexity, and weight of running wiring between onboard systems and each individual entertainment device throughout the interior cabin. The signal may be a distributed signal transmitted via multiple different wireless optical transceivers. Thus, if line-of-sight optical communication is lost with one of the wireless optical transceivers, a wireless optical transceiver associated with a passenger's electronic device may be able to receive the optical communication from another wireless optical transceiver that is transmitting the optical communications. Wireless optical transceivers used by individual entertainment devices may be mounted on seat backs in which the individual entertainment devices are installed. Additionally, computers, wireless telephones, gaming devices, electronic reading devices, and other devices outfitted with or coupled to wireless optical transceivers may communicate wirelessly to access the Internet, make telephone calls, or otherwise engage in data communications.

A vehicle may include an interior cabin equipped with one or more optical transmitters and one or more optical receivers. The optical transmitters may receive a signal from an onboard system, convert it into an optical signal, and transmit the optical signal within the interior cabin. When the optical transmitters are configured to transmit the optical signal in a visible spectrum, the optical transmitters may also serve as cabin lights. Multiple optical transmitters may be used to generate a same optical signal at a plurality of redundant locations in the interior cabin. Devices associated with passenger stations or passenger devices may be configured to communicate with the one or more optical receivers on a same wavelength or at a different wavelength which may or may not be within a visible spectrum.

In a particular embodiment, a wireless optical transceiver includes transmitter light source configured to transmit a first optical signal at a first wavelength. A first ball lens may be coupled to the light source. The first ball lens may have a first surface that includes a first portion and a second portion opposite the first portion. The first surface may be configured to receive the first optical signal from the light source at the first portion and to refract the first optical signal at the first portion and at the second portion to generate a distributed first optical signal. The distributed first optical signal may be configured to be received by a remote receiver via a first line-of-sight transmission. The wireless optical transceiver may also include receiver detector and a second ball lens coupled to the detector. The second ball lens may have a second surface that includes a third portion and a fourth portion opposite the third portion and adjacent to the receiver. The third portion may be configured to receive a second optical signal via a second line-of-sight transmission from a remote transmitter. The second ball lens may be configured to refract the second optical signal at the third portion and at the fourth portion to focus the second optical signal to generate a focused second optical signal. A controller may be operably coupled to the light source and to the detector. The controller may be configured to receive outgoing data and to generate a first electrical signal configured to modulate the first optical signal to transmit the outgoing data. The controller may be configured to receive a second electrical signal from the detector and to demodulate the second electrical signal to generate incoming data.

In another particular embodiment, a method includes receiving a first electrical signal from an onboard system of a vehicle. The first electrical signal may be converted into a first modulated optical signal at a first wavelength. The first modulated optical signal may be refracted to generate a first distributed optical signal. The first distributed optical signal may be projected into a volume of an interior cabin of the vehicle where the first distributed optical signal may be detectable by an electronic device in the interior cabin via a first line-of-sight optical transmission. A second optical signal may be received at a second wavelength via a second line-of-sight optical transmission from the electronic device. The second optical signal may be focused to generate a focused second optical signal. The focused second optical signal may be demodulated to generate a second electrical signal. The second electrical signal may be provided to the onboard system.

In still another particular embodiment, a vehicle includes an interior cabin. An onboard system may be configured to exchange data with at least one electronic device positioned within the interior cabin. The onboard system may be configured to generate a first electrical signal including first data. The onboard system may be configured to receive a second electrical signal that includes second data from the at least one electronic device. A wireless optical network may be configured to enable wireless optical communications with the at least one electronic device within the interior cabin. The wireless optical network may include at least one light source configured to transmit a first optical signal at a first wavelength via a first line-of-sight transmission into the interior cabin. The at least one light source may be configured to receive the first electrical signal from the onboard system and to convert the first electrical signal into the first optical signal. Modulation of the first optical signal may be configured to be undetectable by human vision. At least one detector may be configured to receive a second optical signal at a second wavelength via a second line-of-sight transmission from the at least one electronic device. The at least one detector may be configured to convert the second optical signal into the second electrical signal and to provide the second electrical signal to the onboard system. The second optical signal may be configured to be undetectable by human vision.

The features, functions, and advantages that are described can be achieved independently in various embodiments or may be combined in yet other embodiments, further details of which are disclosed with reference to the following description and drawings.

BRIEF DESCRIPTION OF THE DRAWINGS

FIG. 4 is a side view of a fourth particular illustrative embodiment of a wireless optical transceiver;

FIG. 5 is a side view of a particular embodiment of a pair of wireless optical transceivers exchanging data;

DETAILED DESCRIPTION

Figure 1A:
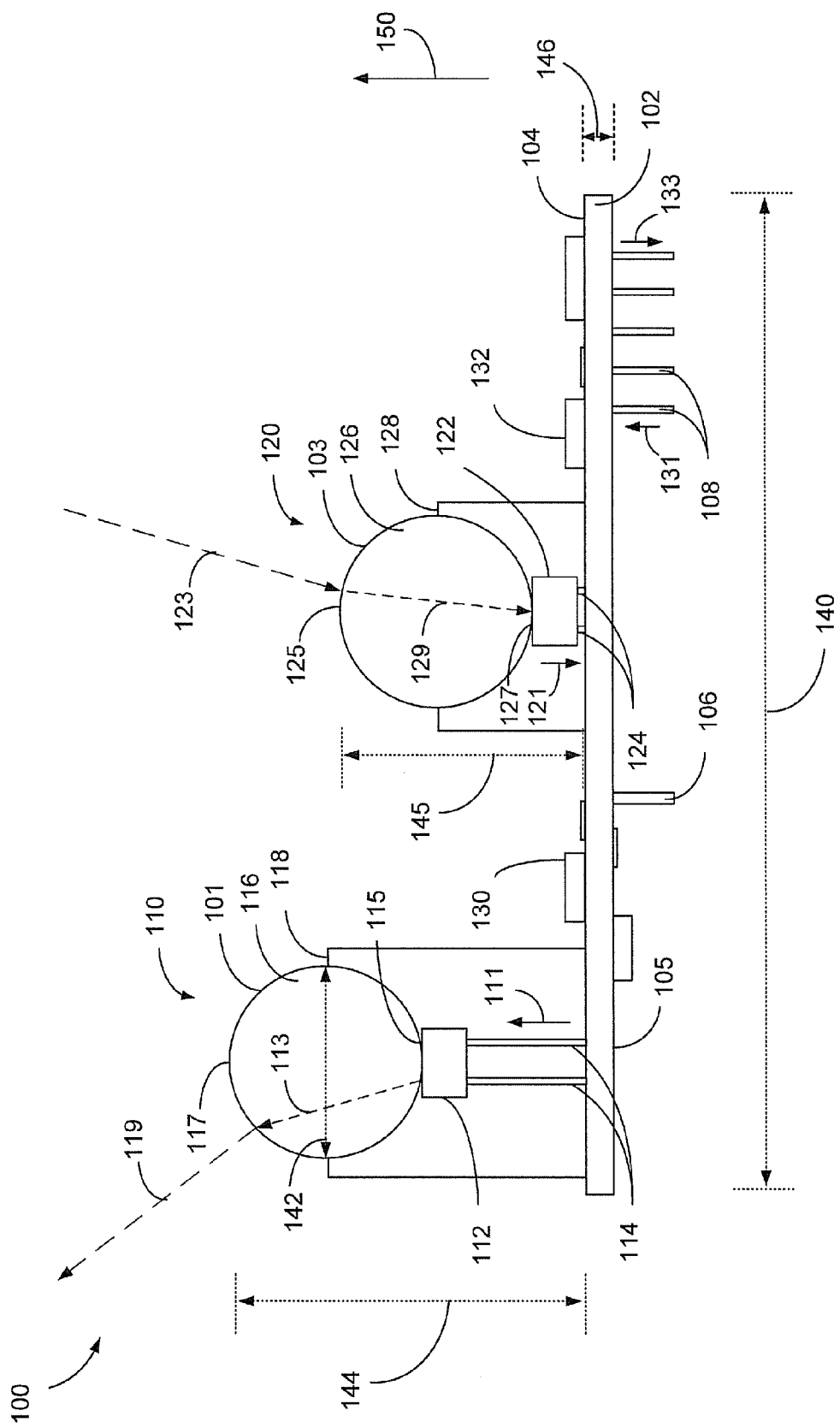
FIGS. 1A, 1B, and 1C are side, top, and bottom views, respectively, of a first particular illustrative embodiment of a wireless optical transceiver.

Embodiments disclosed herein include wireless optical transceivers, methods, and vehicles enabling wireless optical communication. A wireless optical transceiver may include separate transmitter and receiver optical subassemblies that use ball lenses to distribute and focus optical signals. The optical subassemblies may be part of a device configured to conform to the Small Form Factor Transceiver Multisource Agreement (SFF MSA). In order to conform to the SFF MSA, the transmitter and receiver optical subassemblies may be positioned relatively close to one another, which may cause a signal sent by the transmitter optical subassembly to interfere with a signal received by the receiver optical subassembly. Embodiments disclose herein illustrate several approaches that may be used to limit or inhibit such interference. For example, the transmitter optical subassembly may be positioned at an offset relative to the receiver optical subassembly so that signals transmitted by the transmitter optical subassembly do not interfere with reception of other signals by the receiver optical subassembly. In another example, the transmitter and receiver optical subassemblies may be spaced apart. In yet another example, the transmitter optical subassembly may transmit signals using a wavelength that is different from a wavelength of signals received by the receiver optical subassembly.

FIGS. 1A-1C, 2, 3A-3B and 4 depict particular embodiments of wireless optical transceivers that are differently configured to inhibit potential interference of a first optical signal projected by an optical transmitter or a free space transmitter optical subassembly (F-TOSA) of the wireless optical transceiver with a second optical signal received by an optical receiver or a free space receiver optical subassembly (F-ROSA). For purposes of comparison and not as a limitation, the terms "horizontal" and "vertical" are used to contrast the particular embodiments of the wireless optical transceivers as the particular embodiments appear in the drawings of FIGS. 1A-1C, 2, 3A-3B, and 4. The horizontal and vertical designations are used only for purpose of comparison of the particular embodiments of the wireless optical transceivers as shown in FIGS. 1A-1C, 2, 3A-3B, and 4 and are not meant to indicate a particular orientation during use of the wireless optical transceivers. The particular embodiments of the wireless optical transceivers may be installed in any desired orientation irrespective of an orientation of the particular embodiments shown in FIGS. 1A-1C, 2, 3A-3B, and 4.

Figure 2:
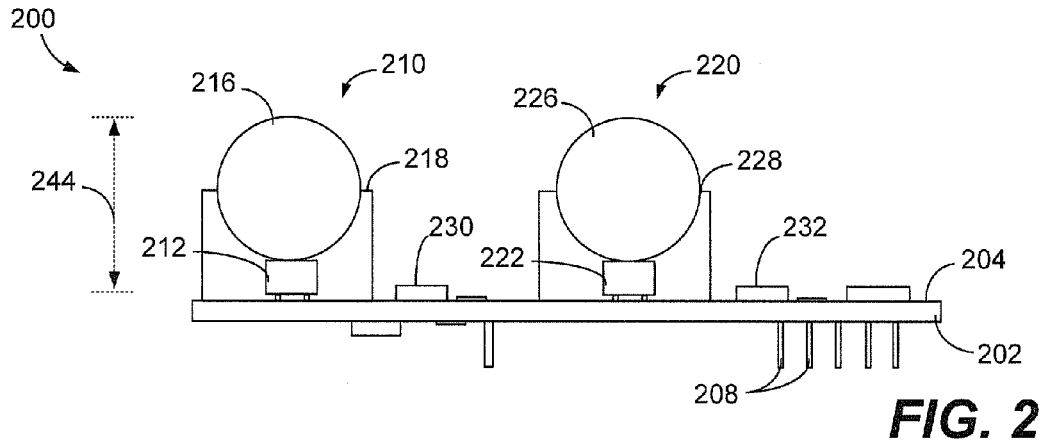
FIG. 2 is a side view of a second particular illustrative embodiment of optical wireless optical transceiver.
Figure 3A:
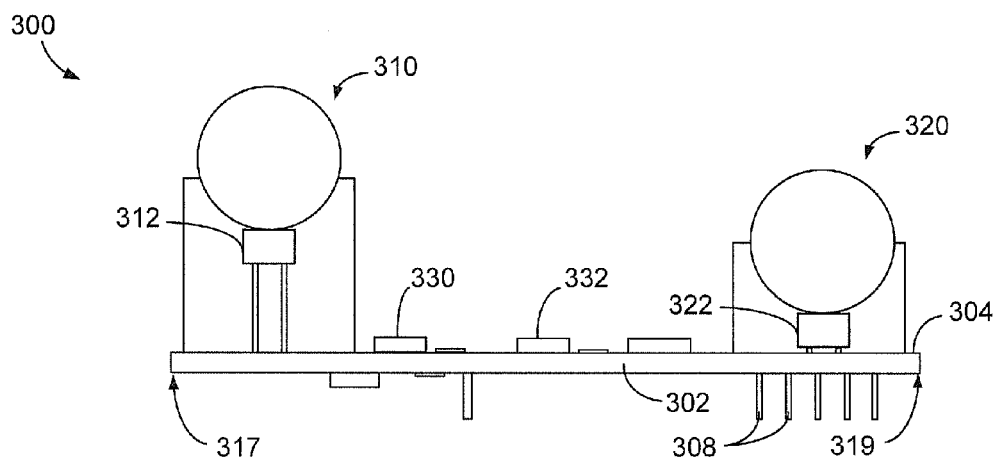
FIGS. 3A and 3B are side views and end views, respectively, of a third particular illustrative embodiment of a wireless optical transceiver.

For example, FIG. 1A depicts a particular embodiment of a wireless optical transceiver 100 in which a F-TOSA 110 may vertically extend to a position beyond a position of a F-ROSA 120. Thus, an optical signal transmitted by the optical transmitter 110 may not impinge upon the F-ROSA 120. FIG. 2 depicts a particular embodiment of a wireless optical transceiver 200 in which an F-TOSA 210 and an F-ROSA 220 may vertically extend to a same position from the wireless optical transceiver 200. To inhibit interference, the F-TOSA 210 may transmit an optical signal at a different wavelength than the F-ROSA 220 is configured to receive. FIG. 3A depicts a particular embodiment of a wireless optical transceiver 300 in which an F-TOSA 310 may be horizontally separated from an F-ROSA 320. The horizontal separation may inhibit the optical signal transmitted by the F-TOSA 310 from impinging upon the F-ROSA 320. Also, as further described with reference to FIG. 2, in any of the particular embodiments of the wireless optical transceivers, properties of ball lenses used in the wireless optical transceivers may be selected to inhibit the distributed optical signal transmitted by the F-TOSA from impinging upon the F-ROSA. The various approaches to reduce interference are illustrated and described separately in the drawings; however, in certain embodiments, two or more of the approaches described may be employed together by a wireless optical transceiver.

FIG. 1A is a side view of a particular illustrative embodiment of a wireless optical transceiver 100. The wireless optical transceiver 100 may include a printed wiring board (PWB) 102, an F-TOSA 110, an F-ROSA 120, a transmitter controller 130, and a receiver controller 132. The F-TOSA 110 and the transmitter controller 130 collectively may be regarded as a transmitter. The F-ROSA 120 and the receiver controller 132 collectively may be regarded as a receiver.

The PWB 102 may be a substantially planar base functioning as both an electrical and a physical foundation for the wireless optical transceiver 100. The F-TOSA 110 and the F-ROSA 120 may be mounted on a first surface 104 of the PWB 102. The F-TOSA 110 and the F-ROSA 120 may each extend from the first surface 104 of the PWB 102 in a first direction 150 that is generally perpendicular to the first surface 104 of the PWB 102. In a particular embodiment, the F-TOSA 110 may include a light source 112, a first ball lens 116, and a first holder 118. The light source 112 may be electrically and physically coupled to the PWB 102 via pair of first electrical leads 114. The first electrical leads 114 may provide a first electrical signal 111 to the light source 112. In response to the first electrical signal 111, the light source 112 may generate a first optical signal 113. The light source 112 may be, for example, a light emitting diode (LED) or a laser. As further described below, the light source 112 may generate light in a spectrum visible to humans or in a spectrum not visible to humans, such as infrared light.

The light source 112 may be positioned at a first portion 115 of a first surface 101 of the first ball lens 116 and secured by the first holder 118. The first holder 118 may be formed of metal in order to dissipate heat absorbed from the light source 112, the first ball lens 116, or both. The first optical signal 113 generated by the light source 112 may be presented to the first portion 115 of the first surface 101 of the first ball lens 116 and may be refracted to exit at a second portion 117 of the first surface 101 of the first ball lens 116 as a refracted or distributed first optical signal 119. The distributed first optical signal 119 may cover a wider area than may be covered by the first optical signal 113. In a particular embodiment, the distributed first optical signal 119 may cover a generally conical range having a larger half-power angle than may be covered by the first optical signal 113 without the first ball lens 116 refracting the first optical signal 113. The distributed first optical signal 119 may transmit content of the first optical signal 113 to one or more receiving devices in a selected coverage zone (not shown in FIG. 1A).

In a particular embodiment, the F-ROSA 120 may include a receiver 122, a second ball lens 126, and a second holder 128. The F-ROSA 120 may include a detector 122 electrically and physically coupled to the PWB 102 with a pair of second electrical leads 124. The second electrical leads 124 may carry a second electrical signal 121 from the detector 122. The second electrical signal 121 may be generated by the detector 122 in response to receiving a focused second optical signal 129. The detector 122 may be positioned at a fourth portion 127 of a second surface 103 of a second ball lens 126. The second ball lens 126 may be secured in place adjacent the detector 122 by a second holder 128. The second holder 128 may be formed of metal in order to dissipate heat absorbed from the detector 122, the second ball lens 126, or both. A second optical signal 123 may be received at a third portion 125 of the second surface 103 of the second ball lens 126. The second optical signal 123 may be refracted by the second ball lens 126 to focus the second optical signal 123 to generate the focused second optical signal 129, which may be focused on the detector 122. The second optical signal 123 may be received at the third portion 125 of the second surface 103 of the second ball lens 126. The second optical signal 123 may carry data received from one or more transmitting electrical devices in a selected coverage zone (not shown in FIG. 1A).

The transmitter controller 130 may receive outgoing data 131 via connector pins 108. The transmitter controller 130 may generate the first electrical signal 111 to drive the light source 112 to modulate the first optical signal 113. The receiver controller 132 may receive the second electrical signal 121 and may demodulate the second electrical signal 121 to generate incoming data 133. The incoming data 133 may be presented at the connector pins 108. The connector pins 108 may electrically couple the wireless optical transceiver 100 to a device (not shown in FIG. 1). The device may be configured to provide the outgoing data 131 and to receive the incoming data 133, as described further with reference to FIGS. 5 and 6. Mounting posts 106 may be used to mechanically couple the wireless optical transceiver 100 to the device with which the wireless optical transceiver 100 communicates via the connector pins 108.

Although the transmitter controller 130 and the receiver controller 132 are shown as being separate, integrated circuit devices in FIGS. 1A, 1C, and 2-4, the transmitter controller 130 and the receiver controller 132 each may be implemented by multiple integrated or non-integrated devices. Alternatively, the transmitter controller 130 and the transmitter receiver 132 also may be implemented in a single device. The transmitter controller 130 and the receiver controller 132 may collectively operate as a controller for the wireless optical transceiver 100.

In a particular embodiment, the wireless optical transceiver 100 is configured to conform to the Small Form Factor Transceiver Multisource Agreement (SFF MSA) specifications. In accordance with the SFF MSA specifications, the PWB 102 may have a length 140 of no greater than 1.9 inches. In accordance with the SFF MSA specification, the PWB may have a width 152 (FIG. 1B) of no greater than 0.5 inches. That is, dimensions of approximately 1.9 inches by 0.5 inches substantially conform to dimensions indicated by the SFF MSA specification. In addition, in a particular embodiment, the PWB 102 may include a wiring pinout that couples the controllers 130 and 132 to the connector pins 108 so as to substantially conform to the wiring pinout described by the SFF MSA specifications.

The first ball lens 116, the second ball lens 126, or both, may each have a relatively small diameter 142 in order to enable the wireless optical transceiver 100 to comply with the SFF MSA specifications. For example, in one embodiment, the diameter 142 of the first ball lens 116 and the second ball lens 126 is approximately 8 millimeters (e.g., approximately 0.315 inches), although smaller or larger ball lens may be used. In a particular embodiment, the ball lenses 116 and 126 are formed of glass or another material having a high refractive index. The high refractive index may enable wide distribution and collection of optical signals. In a particular embodiment, the PWB 102 may a standard PWB thickness 146, such as approximately 60 mils. (e.g., approximately 1.524 millimeters).

The first holder 118 may support the first ball lens 116 so that the second portion 117 of the first surface 101 of the first ball lens 116 extends beyond the third portion 125 of the second surface 103 of the second ball lens 126. A resulting offset of the F-TOSA 110 beyond the F-ROSA 120 thus may reduce or inhibit interference. Specifically, the offset may inhibit the distributed first optical signal 119 generated by the F-TOSA 110 from interfering with the second optical signal 123 received by the F-ROSA 120. For example, the first holder 118 may position the second portion 117 of the first surface 101 of the first ball lens 116 to extend an offset distance beyond the third portion 125 of the second surface 103 of the second ball lens 126, where the offset distance is selected such that the distributed first optical signal 119 may not impinge on the second surface 103 of the second ball lens 126. In a particular embodiment, the offset distance may be at least one-half of the diameter 142 of the first ball lens 116.

For example, to avoid the distributed first optical signal 119 interfering with the second optical signal 123 in the wireless optical transceiver 100 configured to conform to the SFF MSA specification, the second portion 117 of the first ball lens 116 may extend to a first distance 144 of more than one-half inch from the first surface 104 of the PWB 102. The third portion 125 of the second surface 103 of the second ball lens 126 may extend to a second distance 144 of less than one-half inch from the first surface 104 of the PWB 102. In a particular embodiment, where the diameter 142 of the first ball lens 116 is approximately 8 mm (e.g., about 0.315 inch), the first distance 144 at which the first holder 118 supports the first ball lens 116 may be about 16 mm (e.g., about 0.6225 inches) above the first surface 104 of the PWB 102. The second distance 144 at which the second holder 128 supports the second ball lens 126 so that the third portion 125 of the second surface 103 of the second ball lens 116 may be about 12 mm (e.g., about 0.465 inches) from the first surface 104 of the PWB 102. A resulting difference between the first distance 144 and the second distance 145 is approximately 4 mm, or about one-half the diameter 142 of the first ball lens 116

Figure 1B:
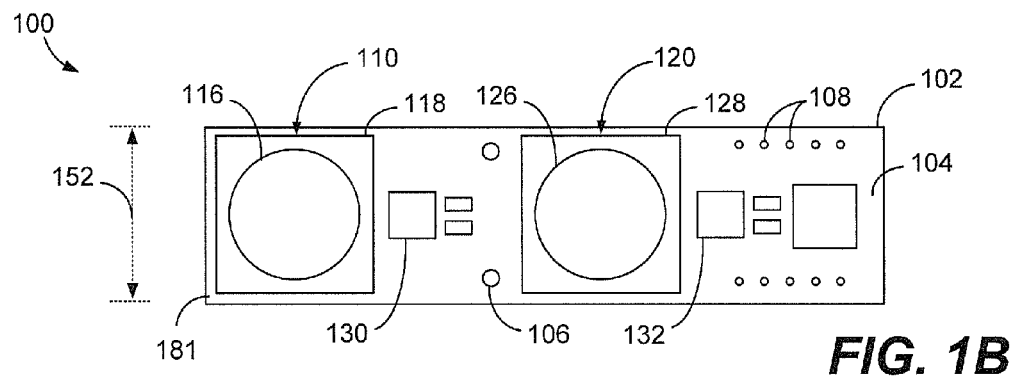
Figure 1C:
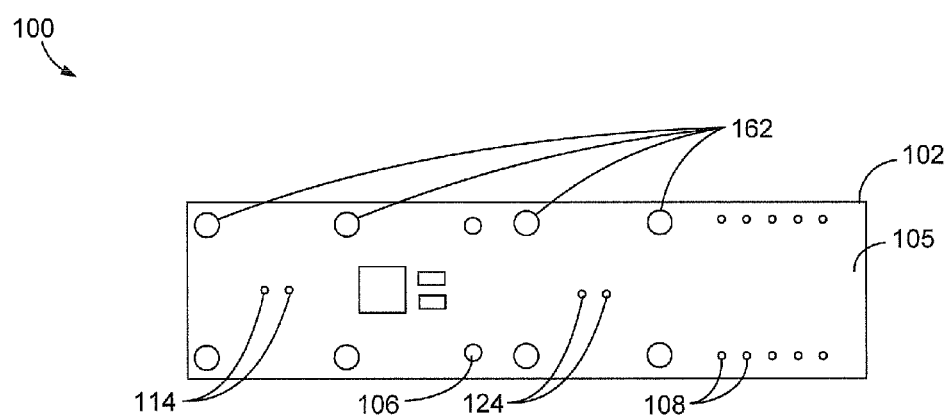

FIG. 1B shows a top view of a particular embodiment of the wireless optical transceiver 100 of FIG. 1A. FIG. 1B shows the F-TOSA 110, the F-ROSA 120, the transmitter controller 130, and the receiver controller 132 positioned on the first surface 104 of the PWB 102. The top view of FIG. 1B also shows the mounting posts 106 and the connector pins 108 that may be used to couple the wireless optical transceiver 100 to another device.

FIB. 1C shows a bottom view of a particular embodiment the wireless optical transceiver 100 of FIGS. 1A and 1B. The bottom view shows the mounting posts 106 and the connector pins 108 that may extend from a second surface 105 of the PWB 102. The bottom view shows the first electrical leads 114 that may electrically and physically couple the light source 112 of the F-TOSA 110 to the PWB 102. The bottom view shows the second electrical leads 124 that may electrically and physically couple the detector 122 of the F-ROSA 120 to the PWB 102. The bottom view also shows screw holes 162 that may be used to physically secure the F-TOSA 110 and F-ROSA 120 to the PWB 102.

FIG. 2 is a side view of a second embodiment of a wireless optical transceiver 200. The wireless optical transceiver 200 may include a PWB 202, an F-TOSA 210, an F-ROSA 220, a transmitter controller 230, and a receiver controller 232. The transmitter controller 230 and the receiver controller 232 may collectively operate as a controller for the wireless optical transceiver 200. The transmitter controller 230 may receive outgoing data (not shown in FIG. 2) via connector pins 208. The transmitter controller 230 may generate the first electrical signal (not shown in FIG. 2) to drive a light source 212 to modulate a first optical signal (not shown in FIG. 2). The receiver controller 232 may receive a second electrical signal (not shown in FIG. 2) generated by a detector 222 in response to receiving a second optical signal (not shown in FIG. 2). The receiver controller 232 may demodulate the second electrical signal to generate incoming data (not shown in FIG. 2). The incoming data may be presented at the connector pins 208.

Unlike the F-TOSA 110 and the F-ROSA 120 of the wireless optical transceiver 100 of FIG. 1, the F-TOSA 210 and the F-ROSA 220 may extend a same distance 244 from a first surface 204 of the PWB 202. The light source 212 and the detector 222 may be positioned at a same distance relative to the first surface 204 of the PWB 202. A first holder 218 may position a first ball lens 216 over the light source 212. A second holder 228 may position a second ball lens 226 over the detector 222 such that the F-TOSA 210 and the F-ROSA 220 may extend the same distance 244 from the first surface 204 of the PWB 202. Depending on an initial transmission angle at which the light source 212 generates the first optical signal to be distributed by the first ball lens 216 and, depending on the refractive properties of the first ball lens 216, interference may be avoided without an offset in the relative positioning of the F-TOSA 210 and the F-ROSA 220. Alternatively or in addition, if the distributed first optical signal generated by the F-TOSA 210 is transmitted at a different wavelength than a second optical signal received by the F-ROSA 220, the distributed first optical signal may impinge upon the second ball lens 226 without causing interference. When the distributed first optical signal is transmitted at a first wavelength that is different than a second wavelength of the second optical signal received by the F-ROSA 220, the distributed first optical signal may be blocked by a filter included in or associated with the F-ROSA 220. Further alternatively or in addition, the detector 222 may be selected or configured to be responsive to the second wavelength of the second optical signal but not to be responsive to the first wavelength of distributed first optical signal.

FIG. 3A is a side view of a third embodiment of a wireless optical transceiver 300. The wireless optical transceiver 300 may include a PWB 302, an F-TOSA 310, an F-ROSA 320, a transmitter controller 330, and a receiver controller 332. The F-TOSA 310, the F-ROSA 320, the transmitter controller 330, and the receiver controller 332 all are mounted on a first surface 304 of the PWB 302, as in the wireless optical transceivers 100 and 200 of FIGS. 1A-1C and FIG. 2, respectively. The transmitter controller 330 and the receiver controller 332 may collectively operate as a controller for the wireless optical transceiver 300. The transmitter controller 330 may receive outgoing data (not shown in FIG. 3A) via connector pins 308 and may generate a first electrical signal (not shown in FIG. 3A). The transmitter controller 330 may drive the light source 312 to modulate a first optical signal (not shown in FIG. 3A). The receiver controller 332 may receive a second electrical signal (not shown in FIG. 3A) generated by a detector 322 in response to receiving a second optical signal (not shown in FIG. 3A). The receiver controller 332 may demodulate the second electrical signal to generate incoming data (not shown in FIG. 3A). The incoming data may be presented at the connector pins 308.

Increasing a separation between the F-TOSA 310 and the F-ROSA 320 may reduce a risk of interference caused by the distributed first optical signal at the F-ROSA 320. For example, the F-TOSA 310 and the F-ROSA 320 may be positioned toward opposite ends 317 and 319 of the wireless optical transceiver 300. Increasing the separation between the F-TOSA 310 and the F-ROSA 320 may be employed with or without positioning the F-TOSA 310 to extend beyond a position of the F-ROSA 320 as shown in FIG. 3A, as described with reference to FIG. 1A. The separation between the F-TOSA 310 and the F-ROSA may also be employed with or without the F-TOSA 310 and the F-ROSA 320 being configured to operate at different wavelengths, as described with reference to FIG. 2.

Figure 3B:
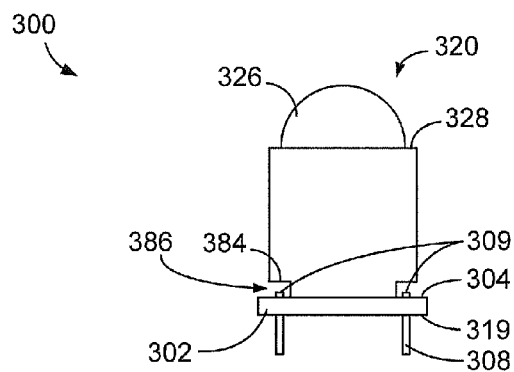

FIG. 3B shows an end view of a particular embodiment of the wireless optical transceiver 300 of FIG. 3A. The end view of FIG. 3B is at a second end 319 adjacent to the R-TOSA 320. The end view of FIG. 3B shows that a holder 328 supporting a second ball lens 326 may include indentations 384 where the holder 328 abuts the first surface 304 of the PWB 302. Each of the indentations 384 may define an isolation groove 386 between the holder 328 and the first surface 304 of the PWB 302 to facilitate compliance of the wireless optical transceiver 300 with the SFF MSA specification. The clearance gap 386 may prevent the holder 318, which may be made of a conductive metal, from contacting protruding ends 309 of the SFF MSA-compliant connector pins 308 extending from the first surface 304 of the PWB 302. Including the indentations 384 to create the clearance gaps 386 in the holder 328 at the second end 319 of the holder 318 because the connector pins 308 extend from the PWB 302 at the second end 319 of the PWB 302. The clearance gaps 386 may prevent the holder 328 from short circuiting or otherwise interfering with the protruding ends 309 of the conductive pins 308 or other conductive surfaces on the first surface 304 of the PWB 302.

FIG. 4 is a side view of a fourth embodiment of a wireless optical transceiver 400. The wireless optical transceiver 400 may include a PWB 402, an F-TOSA 410, an F-ROSA 420, a transmitter controller 430, and a receiver controller 432. The transmitter controller 430 and the receiver controller 432 may collectively operate as a controller for the wireless optical transceiver 400. The transmitter controller 430 may receive outgoing data (not shown in FIG. 4) via connector pins 408. The transmitter controller 430 may generate a first electrical signal (not shown in FIG. 4) to drive a light source 412 to modulate a first optical signal (not shown in FIG. 4). The receiver controller 432 may receive a second electrical signal (not shown in FIG. 4) generated by a detector 422 in response to receiving a second optical signal (not shown in FIG. 4). The receiver controller 432 may demodulate the second electrical signal to generate incoming data (not shown in FIG. 4). The incoming data may be presented at the connector pins 408.

The F-TOSA 410 and the F-ROSA 420 of the wireless optical transceiver 400 extend away from an end 401 of the wireless optical transceiver 400 in a first direction 450 that is generally parallel to surfaces 404 and 405 of the PWB 402. This is in contrast, for example, to the wireless optical transceiver 100 of FIG. 1 in which the first F-TOSA 110 and the first F-ROSA 120 extend in the first direction 150 that is generally perpendicular to the first surface 104 of the PWB 102. The configuration of the wireless optical transceiver 400 illustrated in FIG. 4 may enable optical communication in a range that extends along an axis (not shown in FIG. 4) that extends in the first direction 450.

In the wireless optical transceiver 400, the F-TOSA 410 may include a light source 412. The light source 412 may be coupled to electrical leads 414 that position the light source 412 toward the end 401 of the PWB 402 and facing a direction generally parallel to the surfaces 404 and 405 of the PWB 402. A first ball lens 416 may be positioned relative the light source 412 by a first holder 418 that is coupled to a first surface 404 of the PWB 402. The F-ROSA 420 may include a detector 422 that may be coupled to electrical leads 424 that position the detector 422 toward the end 401 of the PWB 402 and facing a direction generally parallel to the surfaces 404 and 405 of the PWB 402. A second ball lens 426 may be positioned relative the detector 422 by a second holder 428 that may be coupled to a second surface 405 of the PWB 402.

In the particular illustrative embodiment, a first distance 442 at which the F-TOSA 410 extends beyond the end 401 of the PWB 402 may be greater than a second distance 444 at which the F-ROSA 420 extends beyond the end 401 of the PWB 402. As previously described with reference to FIG. 1A, an offset between the first distance 442 and the second distance 444 may reduce interference by preventing the first optical signal (not shown in FIG. 4) generated by the F-TOSA 410 from impinging upon the F-ROSA 420. Additionally or in the alternative, the transducers 412 and 422 may be selected or configured to transmit and receive optical signals at different wavelengths to inhibit interference (e.g., as described with reference to FIG. 2). Refractive properties of the ball lenses 416 and 426 may be selected or configured to inhibit interference (e.g., as described with reference to FIG. 2).

The wireless optical transceiver 400 may be configured to conform to the SFF MSA specification. In order to conform to the SFF MSA specification, the wireless optical transceiver 400 may include mounting posts 406 and connector pins 408 that are longer than, for example, the mounting posts 106 and connector pins 108 of the wireless optical transceiver 100 of FIG. 1. The longer mounting posts 406 and connector pins 408 may provide additional installation clearance for the wireless optical transceiver 400. The additional installation clearance may enable the F-ROSA 420 to be mounted at the second surface 405 of the PWB 402 from which the mounting posts 406 and connector pins 408 extend.

FIG. 5 shows a particular embodiment of a pair of wireless optical transceivers 501 and 511 communicating via distributed optical signals 507 and 517. For example, each of the wireless optical transceivers 501 and 511 may be one of the wireless optical transceivers 400 of FIG. 4. The wireless optical transceivers 501 and 511 may include F-TOSAs 503 and 513 and F-ROSAs 505 and 515 mounted at ends of the wireless optical transceivers 501 and 511, respectively, as described with reference to FIG. 4.

The first wireless optical transceiver 501 may be coupled to a first electrical device 502. In the embodiment of FIG. 5, the first electrical device 502 may provide a socket that engages mounting posts 506 and connector pins 508 extending from the first wireless optical transceiver 510. In a particular illustrative embodiment, the first electrical device 502 may include a socket 509 configured to receive the first wireless optical transceiver 501. The socket 509 may be configured to substantially conform to the SFF MSA specification. The first electrical device 502 also may include a wiring jack 550 that may engage a connector 552 at a terminal end of a communication cable 554. The first electrical device 502 may include one or more communications component, such as a media converter device 503 that translates signals to enable communications between the wireless optical transceiver 501 and a system (not shown in FIG. 5) to which the communication cable 554 is coupled. The first electrical device 502 thus may receive outgoing data (not shown in FIG. 5) and may transmit incoming data via the communication cable 554. The wiring jack 550 and the connector 552 may enable an Ethernet connection using an RJ45 type connection, although any communications protocol and connection types may be used. The second wireless optical transceiver 511 may be coupled to a second electrical device 512. The first electrical device 502 and the second electrical device 512 may enable communications between, for example, separate systems aboard a vehicle (not shown in FIG. 5). Alternatively, the first electrical device 502 may enable communication with an onboard device and the second electrical device 512 may enable communication with a personal or portable device used by a passenger aboard the vehicle.

As illustrated in FIG. 5, the first F-TOSA 503 may extend horizontally further than the first F-ROSA 505 of the first wireless optical transceiver 501. The second F-TOSA 513 of the second wireless optical transceiver 511 also may extend from the second wireless optical transceiver 511 further than the second F-ROSA 515 of the second wireless optical transceiver 511. In FIG. 5, a difference in the distance to which the F-TOSAs 503 and 513 extend beyond the F-ROSAs 505 and 515 is represented by an offset 540. As previously described with reference to FIGS. 1A and 4, the offset 540 may inhibit interference between the first F-TOSA 503 and the first F-ROSA 505 and between the second F-TOSA 513 and the second F-ROSA 515. For example, as a result of the offset 540 between the first F-TOSA 503 and the first F-ROSA 505, a first distributed optical signal 507 transmitted by the F-TOSA 503 may not impinge upon the F-ROSA 505 of the first wireless optical transceiver. Similarly, as a result of the offset 540 between the second F-TOSA 513 and the second F-ROSA 515, a second distributed optical signal 517 transmitted by the F-TOSA 513 may not impinge upon the second F-ROSA 515.

In a particular embodiment, the wireless optical transceivers 501 and 511 are a matched pair. The F-TOSA 503 of the first wireless optical transceiver 501 may be positioned along an upper surface 523 of the first wireless optical transceiver 501. The F-ROSA 515 of the second wireless optical transceiver 511 may be positioned along an upper surface 533 of the second wireless optical transceiver 511. Correspondingly, the F-TOSA 513 of the second wireless optical transceiver 511 may be positioned along a lower surface 535 of the second wireless optical transceiver 511, and the F-ROSA 505 of the first wireless optical transceiver 501 may be positioned along a lower surface 525 of the first wireless optical transceiver 501. The complementary positioning of the F-TOSAs 503 and 513 and the F-ROSAs 505 and 515 may reduce destructive interference between the distributed optical signals 507 and 517 exchanged between the wireless optical transceivers 501 and 511.

The distributed optical signals 507 and 517 may include optical signals within a spectrum visible to the human eye. The distributed optical signals 507 and 517 may be modulated at a high speed such that the modulation of the distributed optical signals 507 and 517 may occur more rapidly than can be detected by human vision. Alternatively, one or both of the distributed optical signals may be transmitted outside of the spectrum visible to the human eye, such as via infra-red signals.

In particular embodiments, interference between the first F-TOSA 503 and the first F-ROSA 505 and between the second F-TOSA 513 and the second F-ROSA 515 may be reduced by configuring the F-TOSAs 503 and 513 transmit at different wavelengths and configuring the F-ROSAs 505 and 515 to receive signals at the different wavelengths. For example, the first F-TOSA 503 may transmit at a first wavelength, $\lambda_1$ and the second F-TOSA 513 may be configured to transmit at a second wavelength, $\lambda_2$ that is different from the first wavelength. Additionally, or in the alternative a refractive index of the ball lenses may be selected to inhibit interference (as described with reference to FIG. 2). Additionally or in the alternative, the F-TOSAs 503 and 513 may be vertically separated from the F-ROSAs 505 and 515 to inhibit interference (as described with reference to FIG. 3A).

Figure 6:
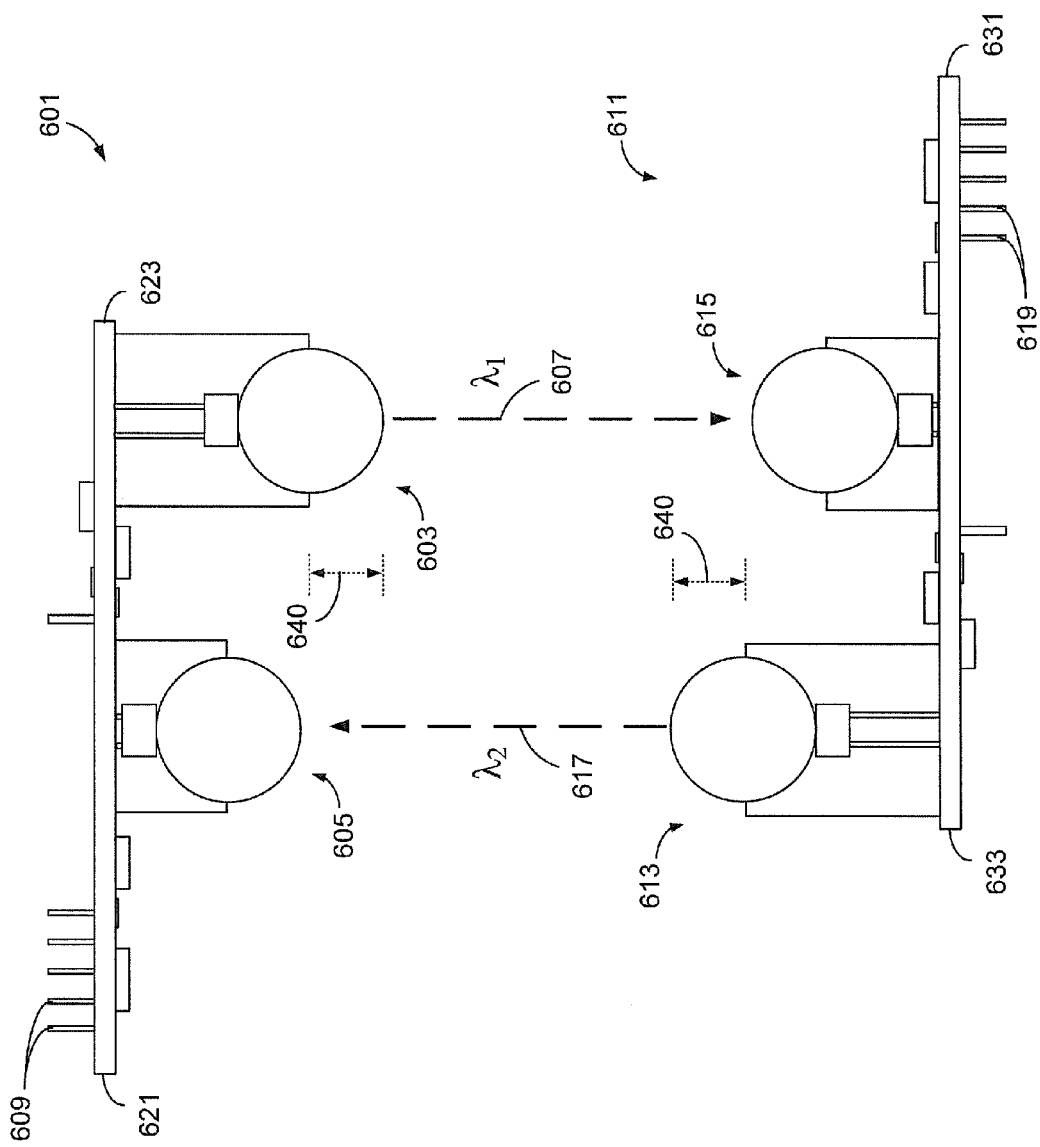
FIG. 6 is a side view of another particular embodiment of a pair of wireless optical transceivers exchanging data.

FIG. 6 shows another particular embodiment of a pair of wireless optical transceivers 601 and 611 communicating via distributed optical signals 607 and 617. For example, each of the wireless optical transceivers 601 and 611 may be one of the wireless optical transceivers 100 of FIGS. 1A-1C, one of the wireless optical transceivers 200 of FIG. 2, or one of the wireless optical transceivers 300 of FIGS. 3A-3B.

The first wireless optical transceiver 601 may be coupled to a first electrical device (not shown in FIG. 6) to enable communications between a first system (not shown in FIG. 6) and a second system (also not shown in FIG. 6) coupled to the second wireless optical transceiver 611. For example, the first wireless optical transceiver 601 may be coupled to an onboard system aboard an aircraft (not shown in FIG. 6) and the second wireless optical transceiver 611 may be coupled to a second onboard system or an electronic device used within a cabin of the aircraft (also not shown in FIG. 6).

As illustrated in FIG. 6, the first F-TOSA 603 may extend further vertically (in a downward direction as shown in FIG. 6) than the first F-ROSA 605 of the first wireless optical transceiver 601. The second F-TOSA 613 of the second wireless optical transceiver 611 also may extend from the second wireless optical transceiver 611 further than the second F-ROSA 615 of the second wireless optical transceiver 611. In FIG. 6, a difference in the distance to which the F-TOSAs 603 and 613 extend beyond the F-ROSAs 605 and 615 is represented by an offset 640. As previously described with reference to FIGS. 1A, 4, and 5, the offset 640 may inhibit interference between the first F-TOSA 603 and the first F-ROSA 605 and between the second F-TOSA 613 and the second F-ROSA 615. For example, as a result of the offset 640 between the first F-TOSA 603 and the first F-ROSA 605, a first distributed optical signal 607 transmitted by the F-TOSA 603 may not impinge upon the F-ROSA 605 of the first wireless optical transceiver. Similarly, as a result of the offset 640 between the second F-TOSA 613 and the second F-ROSA 615, a second distributed optical signal 617 transmitted by the F-TOSA 613 may not impinge upon the second F-ROSA 615.

In a particular embodiment, the wireless optical transceivers 601 and 611 are a matched pair. With reference to orientation of FIG. 6, the F-TOSA 603 of the first wireless optical transceiver 601 may be positioned at right end 623 of the first wireless optical transceiver 601 (removed from the connector pins 609), while the F_ROSA 605 is positioned toward a left end 621 of the first wireless optical transceiver 601 (adjacent to the connector pins 609). The F-ROSA 615 of the second wireless optical transceiver 611 may be positioned at a right end 631 of the second wireless optical transceiver 611 (adjacent to connector pins 619) and opposite the F-TOSA 603 of the first wireless optical transceiver 601. The F-TOSA 613 of the second wireless optical transceiver 611 may be positioned at a left end 633 of the second wireless optical transceiver 611 (opposite the connector pins 619) and opposite the F-ROSA 605 of the first wireless optical transceiver 601. The complementary positioning of the F-TOSAs 603 and 613 and the F-ROSAs 605 and 615 may reduce destructive interference between the distributed optical signals 607 and 617 exchanged between the wireless optical transceivers 601 and 611.

The distributed optical signals 607 and 617 may include optical signals within a spectrum visible to the human eye. The distributed optical signals 607 and 617 may be modulated at a high speed such that the modulation of the distributed optical signals 607 and 617 may occur more rapidly than can be detected by human vision. Alternatively, one or both of the distributed optical signals 607 and 617 may be transmitted outside of the spectrum visible to the human eye, such as via infra-red signals.

In particular embodiments, interference between the first F-TOSA 603 and the first F-ROSA 605 and between the second F-TOSA 613 and the second F-ROSA 615 may be reduced by configuring the F-TOSAs 603 and 613 transmit at different wavelengths and configuring the F-ROSAs 605 and 615 to receive signals at the different wavelengths. For example, the first F-TOSA 603 may transmit at a first wavelength, $\lambda_1$ and the second F-TOSA 613 may be configured to transmit at a second wavelength $\lambda_2$ that is different from the first wavelength. Additionally, or in the alternative, a refractive index of the ball lenses may be selected to inhibit interference (as described with reference to FIG. 2). Additionally or in the alternative, the F-TOSAs 603 and 613 may be horizontally separated from the F-ROSAs 605 and 615 to inhibit interference (as described with reference to FIG. 3A).

Figure 7:
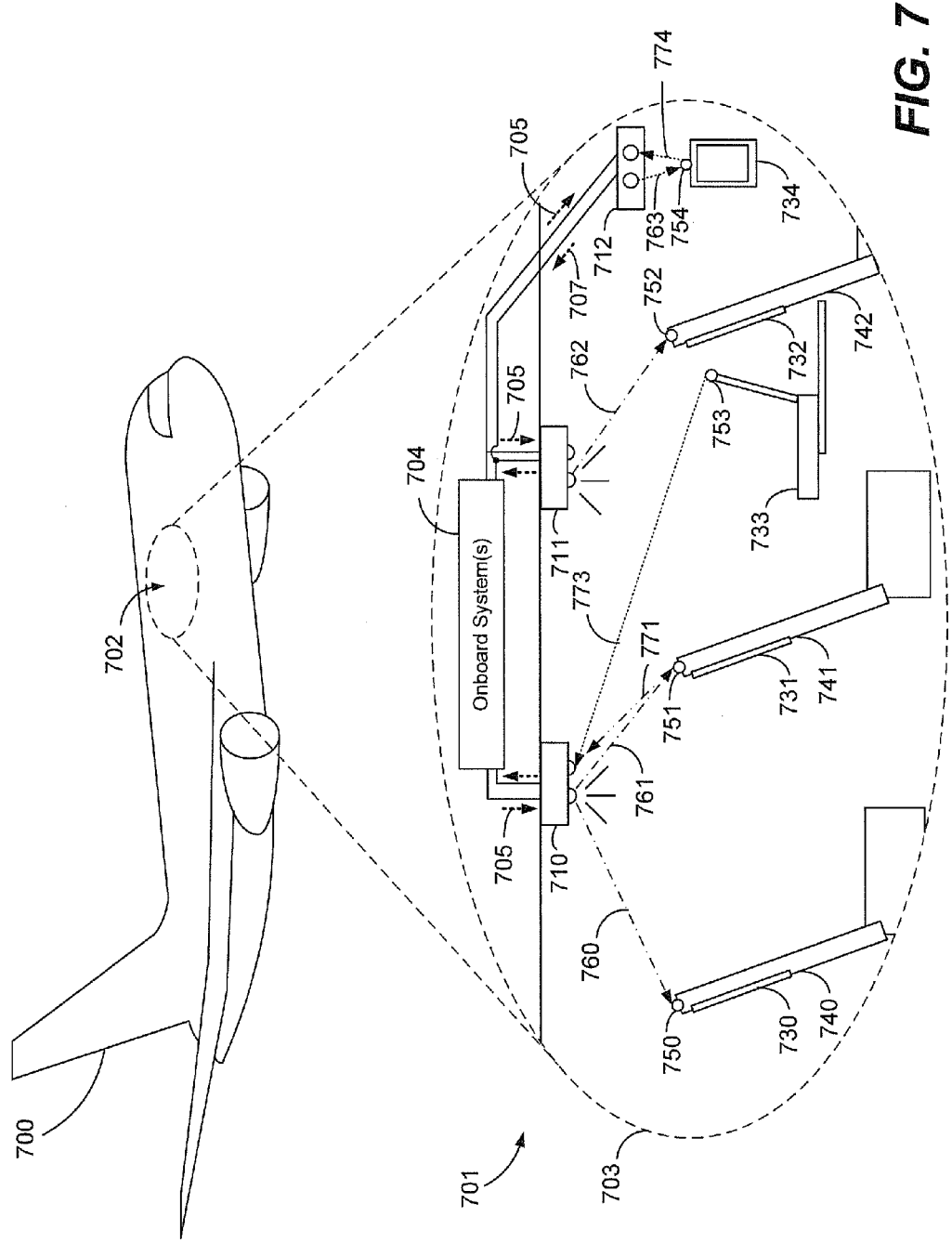
FIG. 7 is a cutaway view of a particular embodiment of a section of an interior cabin of a vehicle in which a wireless optical network is used to communicate between one or more onboard systems and one or more electronic devices within the interior cabin.

FIG. 7 is a cutaway view of a particular embodiment of a section 703 of an interior cabin 702 of a vehicle 700, such as a commercial passenger aircraft, in which a wireless optical network 701 may enable communication between one or more onboard systems 704 and one or more electronic devices 730-734 used within the interior cabin 702. The wireless optical network 701 used in the interior cabin 702 may employ a plurality of wireless optical transceivers as described with reference to FIGS. 1A-6.

The one or more onboard systems 704 may include an in-flight entertainment (IFE) server, a wireless air-to-ground Internet server, a telephone air-to-ground relay system, payment systems for IFE or other chargeable in-flight services, or any other type of onboard system passengers may wish to access. The one or more onboard systems 704 also may include systems that support a cabin crew. For example, the onboard systems 704 may include systems relating to food and drink service or other cabin services. The electronic devices 730-734 may include personal IFE devices 730-732, personal computers, such as a notebook computer 733, handheld devices, such as a smart phone 734, or other devices. The one or more onboard systems 704 may be connected, e.g., via a wired connection, to a first plurality of wireless optical transceivers 710-712. The one of more onboard systems 704 provide a first electrical signal 705 to the first plurality of wireless optical transceivers 710-712. The first plurality of wireless optical transceivers 710-712 may modulate the first electrical signal 705 to generate distributed optical signals 760-763. The distributed optical signals 760-763 may be projected into the interior cabin 702 to communicate with the second plurality of wireless optical transceivers 750-754. The second plurality of wireless optical transceivers 750-754 may be coupled to the electronic devices 730-734. Thus, the onboard systems 704 and the electronic devices 730-734 may communicate via the first plurality of wireless optical transceivers 710-712 and the second plurality of wireless optical transceivers 750-754.

The wireless optical transceivers 710-712 may include or be included within cabin lights so that distributed optical signals 760-762 provide a source of cabin illumination. The wireless optical transceivers 710-712 may be overhead lights, such as the wireless optical transceivers 710 and 711, or they may be may be personal passenger lights. Alternatively, the wireless optical transceivers 710-712 may transmit the distributed optical signals 760-763 outside the visible spectrum, such as in an infrared spectrum. Additionally or in the alternative, the wireless optical transceivers 710-712 may transmit the distributed optical signals 760-763 within the visible spectrum when other cabin lights are turned on (either overhead cabin lights or personal passenger lights) and may transmit the distributed optical signals 760-763 outside the visible spectrum when the other cabin lights are turned off.

The personal IFE devices 730-732 may receive signals that broadcast an in-flight movie or other IFE via first distributed optical signals 760-762. The first distributed optical signals 760-762 may be transmitted by the first wireless optical transceivers 710 and 711 that function as overhead cabin lights that provide cabin illumination. One of the first wireless optical transceivers 710 and 711 may provide communications for more than one of the electronic devices. For example, the first wireless optical transceiver 710 may provide service to the personal IFE devices 730 and 731 and to the notebook computer 733. The personal IFE devices 730-732 may receive the first distributed optical signals 760-762 via the second wireless optical transceivers 750-752, respectively.

The personal IFE devices 730-732 may transmit data via the second wireless optical transceivers 750-752. For example, the personal IFE device 731 may transmit an entertainment selection or other data via the second wireless optical transceiver 751 to the first wireless optical transceiver 710. In a particular embodiment, data transmitted via the second wireless optical transceivers 750-752 to the first wireless optical transceivers 710-712 may be transmitted at a wavelength outside the visible spectrum to reduce irritation or annoyance of passengers that may be caused by spurious sources of light within the interior cabin 702.

The wireless optical network 701 in the interior cabin 702 may also enable communication with other electronic devices, such as the notebook computer 733 and the smart phone 734. For the notebook computer 733 and the smart phone 734 to communicate via the optical wireless network, the notebook computer 733 and the smart phone 734 each may be equipped with, fitted with, or coupled to second wireless optical transceivers 753 and 754. Alternatively or in addition, a jack may be provided in one or more seatbacks 740-742, enabling the notebook computer 733 and the smart phone 734 to use a built-in second wireless optical transceiver, such as one of the second wireless optical transceivers 750-752. In FIG. 7, the notebook computer 733 is shown transmitting data at a second optical wireless signal 773 via the second wireless optical transceiver 753. The smart phone 734 is shown receiving data at the second wireless optical transceiver 754 via a first optical wireless signal 763 and transmitting data from the second wireless optical transceiver 754 via a second optical wireless signal 774. The first optical wireless signal 763 and the second optical wireless signal 774 may be exchanged with the first wireless optical transceiver 712. The first wireless optical transceiver 712 may demodulate the second optical signal 774 to generate a second electrical signal 707. The first wireless optical transceiver 712 may send the second electrical signal 707 to the one or more onboard systems 704, e.g., via a wired connection.

Figure 8:
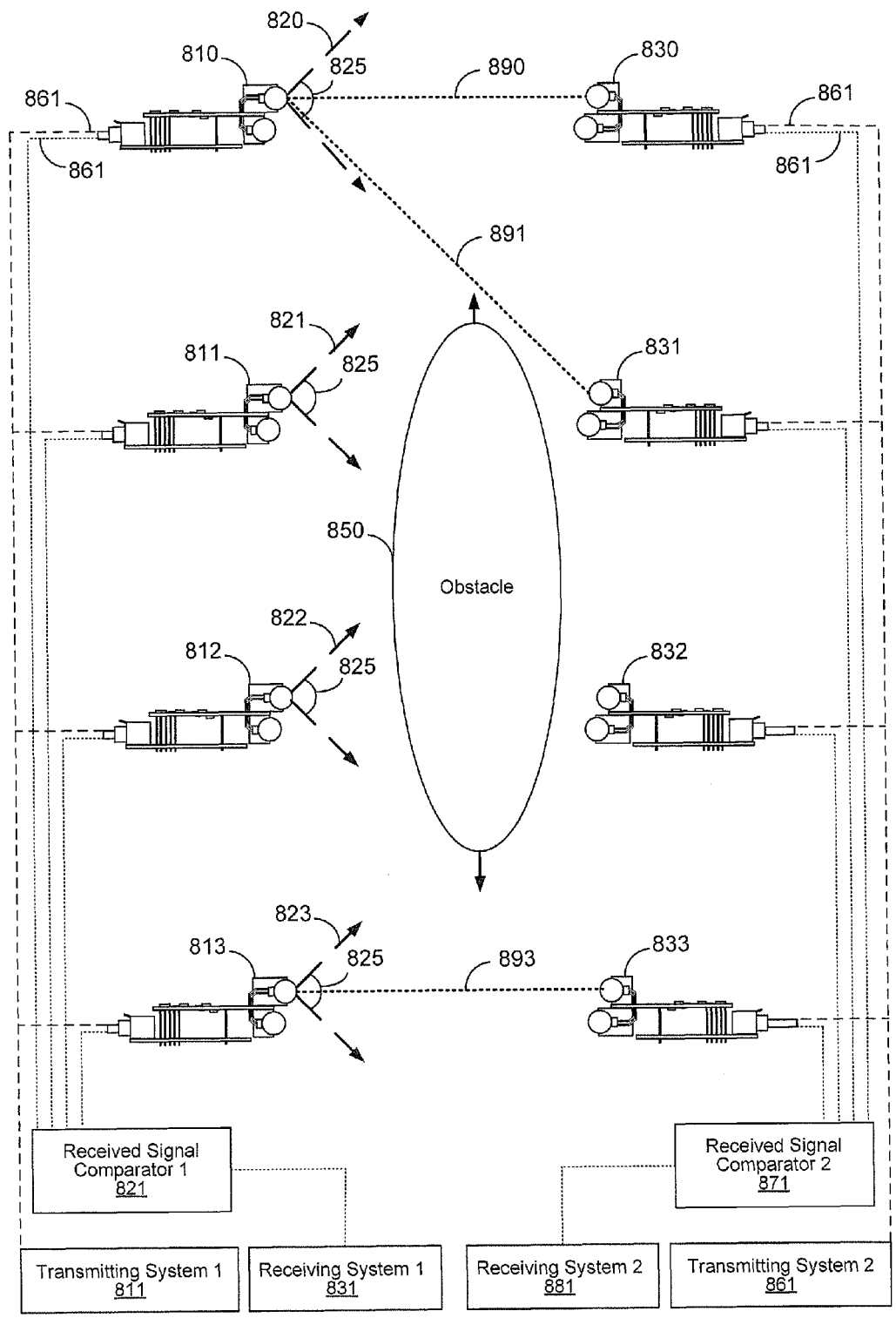
FIG. 8 is a view of a particular embodiment of a first plurality of wireless optical transceivers transmitting a distributed signal to a second plurality of wireless optical transceivers.

FIG. 8 shows a particular embodiment of an environment in which a plurality of first wireless optical transceivers 810-813 communicate data from a first transmitting device 811 to a second receiving system 881 via a plurality of separate second wireless optical transceivers 830-833 in a multipleinput multiple-output ("MIMO") configuration. The plurality of second wireless optical transceivers 830-8-833 may also communicate data from a second transmitting device 861 to a first receiving system 831 via the plurality of first wireless optical transceivers 810-813. The plurality of first wireless optical transceivers 810-813 and the plurality of separate second wireless optical transceivers 830-833 may include one or more of the particular embodiments of wireless optical transceivers 100, 200, 300, and 400 as described with reference to FIGS. 1A-1C, 2, 3A-3B, and 4, respectively. Each of the wireless optical transceivers 810-813 and 830-833 may be positioned to transmit and receive signals in an intended coverage zone. For example, the first plurality of wireless optical transceivers 810-813 are shown as having coverage areas 820-823. The coverage zones 820-823 may be defined by a half-power angle 825 that may be the same for each of the wireless optical transceivers 810-813, as shown in FIG. 8, or the coverage zones may be of different shapes depending on a nature of the operating environment in which or the application with which the wireless optical transceivers 810-813 may be used.

In the optical MIMO configuration, signals are transmitted from a plurality of redundant locations between the pluralities of first and second wireless optical transceivers 810-813 and 830-833. As previously described, wireless optical communication requires a line of sight between communicating transceivers. In the optical MIMO configuration of FIG. 8, however, if an obstacle 850 should block one or more lines of sight between the pluralities of first and second wireless optical transceivers 810-813 and 830-833, the signals still may be communicated between the pluralities of first and second wireless optical transceivers 810-813 and 830-833. When the obstacle 850 moves, other lines of sight may be blocked while other lines of sight may be cleared.

Because each of the signals being transmitted by the first plurality of wireless optical transceivers 810-813 and by the second plurality of wireless optical transceivers 830-833 are redundant, only one instance of the signal received by the plurality of receiving wireless optical transceivers 830-833 may be presented to the second receiving system 881. Thus, in a particular embodiment, outputs for the signals received the plurality of second wireless optical transceivers 830-833 may be coupled to a second received signal comparator 871. The second received signal comparator 871 may determine which of the plurality of second wireless optical transceivers 830-833 has received a strongest signal. The strongest signal then may be presented to the second receiving system 881. Thus, for example, if the second wireless optical transceivers 830, 831, and 833 each receive a signal along open lines of sight 890, 891, and 893, respectively, the second received signal comparator 871 may determine which of the second wireless optical transceivers 830, 831, and 833 has received a strongest signal and then may present that signal to the second receiving system 881. Thus, the second receiving system 881 may receive the signal transmitted by the first transmitting system 811 even though, for example, the second wireless optical transceiver 832, may have no clear line of sight to any of the plurality of first wireless optical transceivers 810-813 and the second wireless optical transceiver 831 may have only an oblique line of sight to one of the plurality of first wireless optical transceivers 810-813. Correspondingly, outputs for the signals received by the plurality of first wireless optical transceivers 810-813 may be coupled to a first received signal comparator 821. The first received signal comparator 821 may determine which of the plurality of first wireless optical transceivers 810-813 has received a strongest signal. The strongest signal then may be presented to the first receiving system 831.

Figure 9:
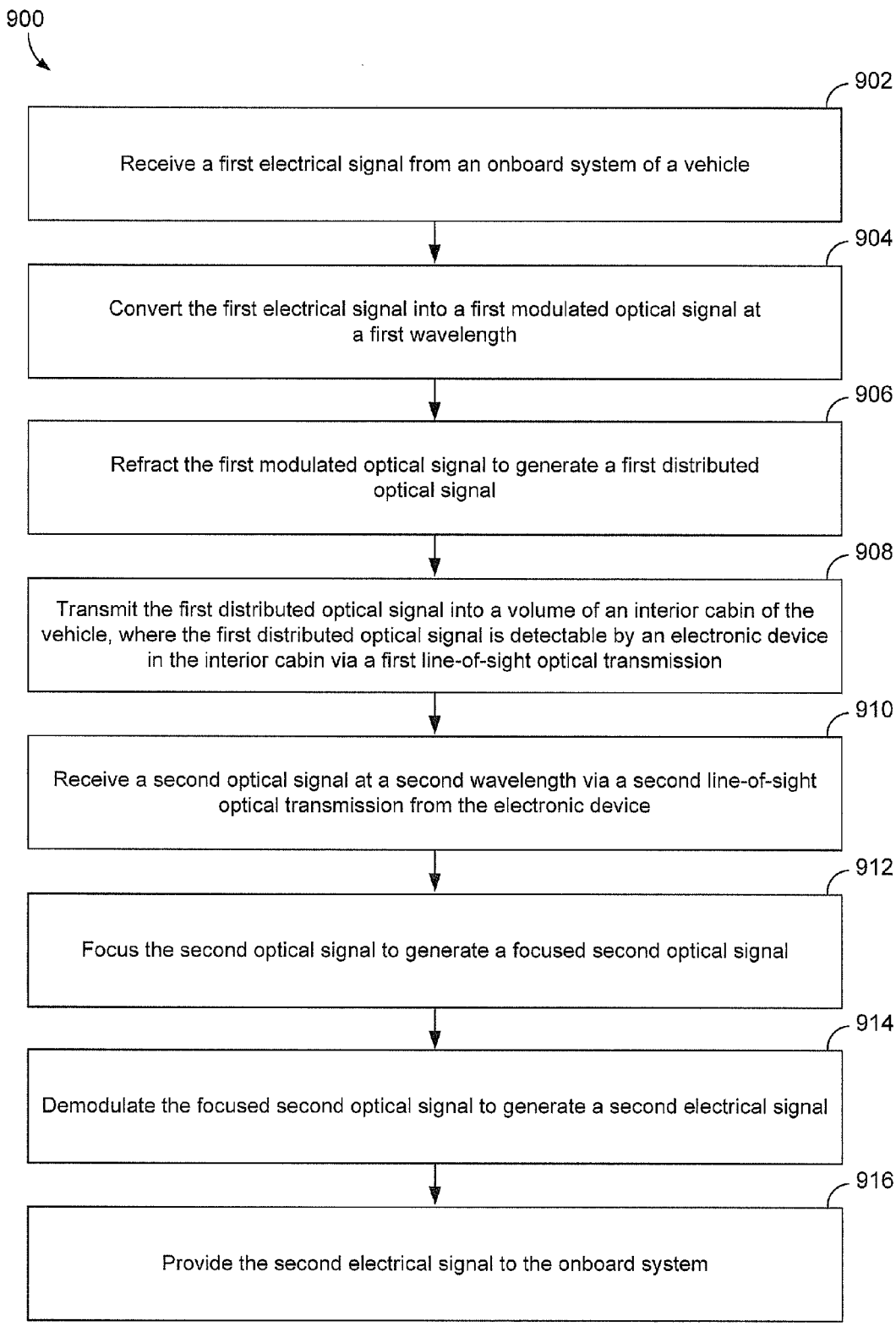
FIG. 9 is a flow diagram of a particular illustrative embodiment of a method of wireless optical communication within an interior cabin of a vehicle.

FIG. 9 is a flow diagram of a particular illustrative embodiment of a method 900 of wireless optical communication aboard a vehicle. The wireless optical communication may be provided using wireless optical transceivers, such as one or more of the wireless optical transceivers 100, 200, 300, and 400 of FIGS. 1A-1C, 2, 3A-3B, and 4, respectively. The method 900 may be performed, for example, by a pair of wireless optical transceivers, such as the first wireless optical transceiver 501 and the second wireless optical transceiver 511 of FIG. 5. The method 900 may be performed aboard a vehicle, as described with reference to FIG. 7.

A first electrical signal may be received from an onboard system of a vehicle, at 902. For example, the first electrical signal may include outgoing data 131 presented at the connector pins 108, as described with reference to FIG. 1A. As described with reference to FIG. 5, the first wireless optical transceiver 501 may receive the first electrical signal from a first electrical device 502 that is coupled to an onboard system via a communication cable 554. The first electrical signal may be converted into a first modulated optical signal at a first wavelength, at 904. For example, the first electrical signal may be converted into a first optical signal 113 by the transmitter controller 130 and the light source 112 of FIG. 1A. Modulation of the first modulated optical signal may be substantially undetectable by a human eye. To illustrate, the first wavelength may be substantially outside the visible spectrum and, thus, undetectable by human vision. In another illustration, the first modulated optical signal may be modulated at a high frequency so that, whether or not the first wavelength is within the visible spectrum, the modulation of the first modulated optical signal may not be detectable by human vision.

The first modulated optical signal may be refracted to generate a first distributed optical signal, at 906. For example, the first modulated optical signal 113 of FIG. 1 may be presented to the first portion 115 of the first surface 101 of the first ball lens 116. The first ball lens 116 may refract the first modulated optical signal 113 to generate the distributed first optical signal 119 at the second portion 117 of the first surface 101 of the first ball lens 116. The first distributed optical signal may be transmitted into a volume of an interior cabin of the vehicle, at 908. The first distributed optical signal may be detectable by an electronic device in the interior cabin via a first line-of-sight optical transmission. For example, the first distributed optical signal 760 of FIG. 7 is transmitted by the first wireless optical transceiver 710 into the interior cabin 702 of the vehicle 700. As described with reference to FIG. 8, the distributed first optical signal may be transmitted throughout zones 820-823 that have a substantially conical shape.

A second optical signal at a second wavelength may be received via a second line-of-sight optical transmission from the electronic device, at 910. The second optical signal may be undetectable by the human eye. For example, an electronic device, such as the electronic device 731 of FIG. 7, may send the second optical signal 771 to the first wireless optical transceiver 710. The second optical signal may be focused to generate a focused second optical signal, at 912. For example, the second optical signal 123 of FIG. 1A impinges upon the third portion 125 of the second surface 103 of the second ball lens 126. The second ball lens 126 focuses the second optical signal 123 to present the focused second optical signal 129 to the detector 122.

The focused second optical signal may be demodulated to generate a second electrical signal, at 914. For example, the detector 122 of FIG. 1A and the receiver controller 132 may demodulate the focused second optical signal 129 to generate the incoming data 133 presented at the connector pins 108. The second electrical signal may be provided to the onboard system, at 916. For example, the first wireless optical transceiver 712 of FIG. 7, after receiving and demodulating the second optical signal 774 to generate the second electrical signal 707, presents the second electrical signal 707 to the one or more onboard systems 704.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. For example, method steps may be performed in a different order than is shown in the figures or one or more method steps may be omitted. Accordingly, the disclosure and the figures are to be regarded as illustrative rather than restrictive.

Moreover, although specific embodiments have been illustrated and described herein, it should be appreciated that any subsequent arrangement designed to achieve the same or similar results may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, the claimed subject matter may be directed to less than all of the features of any of the disclosed embodiments.

What is claimed is:

1. A method comprising:
receiving, from at least one of a first plurality of wireless optical transceivers at first redundant locations within an interior cabin of a vehicle, a first distributed optical signal by a set of wireless optical transceivers of a second plurality of wireless optical transceivers at second redundant locations within the interior cabin of the vehicle at a first wavelength via open line-of-sight transmissions, wherein the second plurality of wireless optical transceivers is coupled to a signal comparator that is onboard the vehicle, and wherein the signal comparator is coupled to a receiving system that is onboard the vehicle;
generating, by each wireless optical transceiver of the set of wireless optical transceivers that received the first distributed optical signal, output corresponding to the first distributed optical signal;
sending, by each wireless optical transceiver of the set of wireless optical transceivers that received the first distributed optical signal, the generated output to the signal comparator;
determining, by the signal comparator, which of the wireless optical transceivers of the set of wireless optical transceivers that received the first distributed optical signal received a strongest signal; and
presenting the generated output corresponding to the strongest signal to the receiving system.

2. The method of claim 1, wherein at least one wireless optical transceiver of the second plurality of wireless optical transceivers does not receive the first distributed optical signal in response to at least a partially blocked line of sight transmission.

3. The method of claim 1, wherein generating the output corresponding to the first distributed optical signal, by each wireless optical transceiver of the set of wireless optical transceivers that received the first distributed optical signal, includes:
focusing the first distributed optical signal to generate a focused optical signal; and
demodulating the focused optical signal to generate an electrical signal.

4. The method of claim 1, further comprising transmitting, by at least one of the second plurality of wireless optical transceivers, a second distributed optical signal to a set of wireless optical transceivers of the first plurality of wireless optical transceivers at a second wavelength via line-of-sight transmissions.

5. The method of claim 4, wherein the first distributed optical signal provides cabin illumination within the interior cabin.

6. The method of claim 4, wherein transmitting, by the at least one of the second plurality of wireless optical transceivers, includes:
receiving an electrical signal;
converting the electrical signal into a modulated optical signal at the second wavelength;
refracting the modulated optical signal to generate the second distributed optical signal; and
transmitting the second distributed optical signal into a volume of the interior cabin of the vehicle.

7. The method of claim 6, wherein modulation of the modulated optical signal is substantially undetectable by the human eye because at least one of the first wavelength is outside a visible light spectrum or a frequency of the modulation is greater than a modulation frequency detectable by the human eye.

8. The method of claim 4, wherein at least one wireless optical transceiver of the first plurality of wireless optical transceivers does not receive the second distributed optical signal in response to at least a partially blocked line of sight transmission.

9. The method of claim 4, wherein a particular wireless optical transceiver of the second plurality of wireless optical transceivers includes:
a light source configured to transmit the second distributed optical signal at the second wavelength; and
a detector configured to receive the first distributed optical signal at the first wavelength.

10. A vehicle comprising:
a signal comparator;
a receiving system;
an interior cabin;
a first plurality of wireless optical transceivers at first redundant locations within the interior cabin; and
a second plurality of wireless optical transceivers at second redundant locations within the interior cabin, wherein the second plurality of wireless optical transceivers is coupled to the signal comparator, wherein the signal comparator is coupled to the receiving system;

wherein a set of wireless optical transceivers of the second plurality of wireless optical transceivers is configured to receive a first distributed optical signal at a first wavelength via open line-of-sight transmissions from at least one of the first plurality of wireless optical transceivers, wherein each wireless optical transceiver of the set of wireless optical transceivers that received the first distributed optical signal is configured to generate output corresponding to the first distributed optical signal and send the generated output to the signal comparator; and wherein the signal comparator is configured to determine which of the wireless optical transceivers of the set of wireless optical transceivers received a strongest signal and to present the generated output corresponding to the strongest signal to the receiving system.

11. The vehicle of claim 10, wherein at least one wireless optical transceiver of the second plurality of wireless optical transceivers does not receive the first distributed optical signal in response to at least a partially blocked line of sight transmission.

12. The vehicle of claim 10, wherein each wireless optical transceiver of the set of wireless optical transceivers is configured to generate the output corresponding to the first distributed optical signal by:

focusing the first distributed optical signal to generate a focused optical signal; and demodulating the focused optical signal to generate an electrical signal.

13. The vehicle of claim 10, wherein each wireless optical transceiver of the first plurality of wireless optical transceivers that transmits the first distributed optical signal is configured to:

receive an electrical signal;

convert the electrical signal into a modulated optical signal at the first wavelength, wherein modulation is substantially undetectable by the human eye;

refract the modulated optical signal to generate the first distributed optical signal; and transmit the first distributed optical signal into a volume of the interior cabin.

14. The vehicle of claim 10, wherein at least one of the second plurality of wireless optical transceivers is configured to transmit a second distributed optical signal to a set of wireless optical transceivers of the first plurality of wireless optical transceivers at a second wavelength via line-of-sight transmissions.

15. The vehicle of claim 14, wherein the second wavelength is within a visible spectrum, and the second distributed optical signal provides cabin illumination within the interior cabin.

16. The vehicle of claim 14, wherein the at least one of the second plurality of wireless optical transceivers is configured to:

receive an electrical signal;

convert the electrical signal into a modulated optical signal at the second wavelength, wherein modulation is substantially undetectable by the human eye because at least one of the second wavelength is outside a visible light spectrum or a frequency of the modulation is greater than a modulation frequency detectable by the human eye;

refract the modulated optical signal to generate the second distributed optical signal; and transmit the second distributed optical signal into a volume of the interior cabin.

17. The vehicle of claim 16, further comprising a transmitting system, wherein the transmitting system is onboard the vehicle and coupled to the second plurality of wireless optical transceivers to provide the electrical signal.

18. The vehicle of claim 14, wherein at least one wireless optical transceiver of the first plurality of wireless optical transceivers does not receive the second distributed optical signal in response to at least a partially blocked line of sight transmission.

19. The vehicle of claim 14, wherein a particular wireless optical transceiver of the second plurality of wireless optical transceivers includes:

a light source configured to transmit the second distributed optical signal at the second wavelength; and a detector configured to receive the first distributed optical signal at the first wavelength.

20. The vehicle of claim 19, wherein the light source is included in a transmitter optical subassembly and the detector is included in a receiver optical subassembly, and wherein the transmitter optical subassembly is positioned at an offset to the receiver optical subassembly to reduce interference between a transmitted signal and a received signal.

* * * * *